United States Patent [19]
Ando et al.

[11] 4,058,827
[45] Nov. 15, 1977

[54] COLOR SEPARATING OPTICAL SYSTEM FOR A TELEVISION CAMERA

[75] Inventors: Kunio Ando, Warabi; Takemi Saito, Kawagoe; Takeshi Higuchi, Tokyo, all of Japan

[73] Assignee: Fuji Photo Optical Co., Ltd., Omiya, Japan

[21] Appl. No.: 671,024

[22] Filed: Mar. 26, 1976

[30] Foreign Application Priority Data
Apr. 2, 1975   Japan ................................. 50-40075

[51] Int. Cl.² ............................................. H04N 9/09
[52] U.S. Cl. ............................................. 358/55; 358/225
[58] Field of Search ................. 358/55, 50, 52, 225; 178/DIG. 14, DIG. 38, DIG. 29, 7.85, 7.86, DIG. 27, 7.2

[56] References Cited
U.S. PATENT DOCUMENTS

| | | | |
|---|---|---|---|
| 2,431,824 | 12/1947 | Poch | 178/DIG. 29 |
| 2,952,188 | 9/1960 | Bang | 178/7.85 |
| 3,333,053 | 7/1967 | Back | 178/7.86 |
| 3,381,084 | 4/1968 | Wheeler | 358/55 |
| 3,610,818 | 10/1971 | Bachmann | 358/55 |
| 3,718,751 | 2/1973 | Landre et al. | 358/50 |

*Primary Examiner*—John C. Martin
*Attorney, Agent, or Firm*—Harold L. Stults

[57] ABSTRACT

Means is provided for selectively inserting any one of one or more glass elements having parallel flat sides between the color separating prism and the objective of a television camera so as to adjust the glass length of the optical system to meet the requirements of the particular image pick-up tube concerned.

4 Claims, 8 Drawing Figures

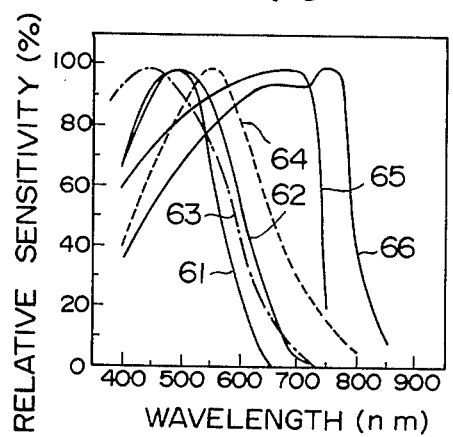
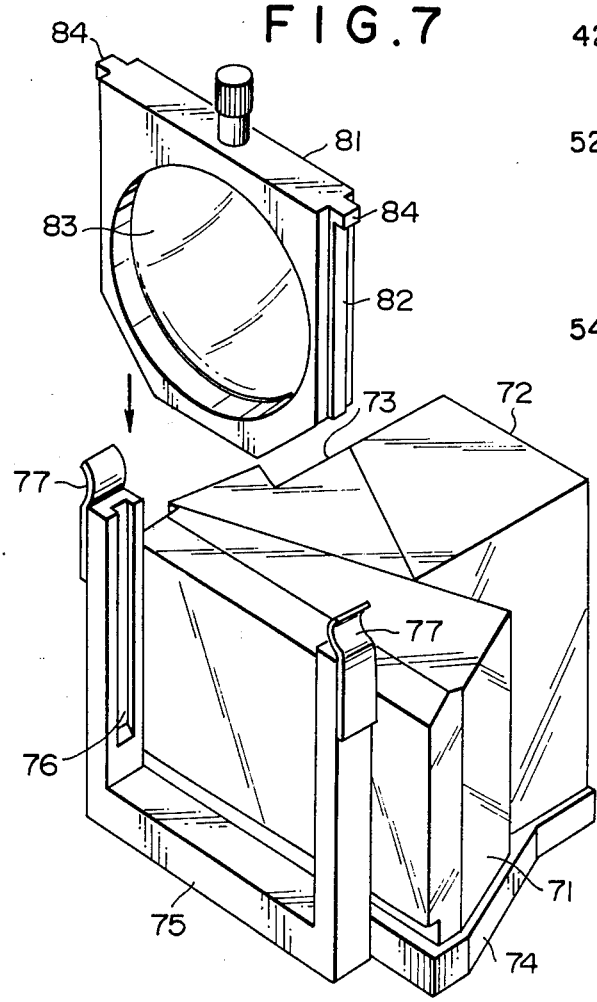
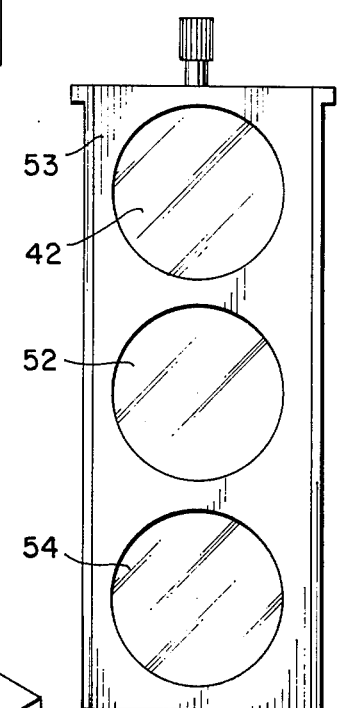

COLOR SEPARATING OPTICAL SYSTEM FOR A TELEVISION CAMERA

BACKGROUND OF THE INVENTION

1. Field of the Invention

This invention relates to a color separating optical system, and more particularly to a color separating optical system for use in a color television camera.

2. Description of the Prior Art

The television camera presently having the widest usage in television broadcasting is the RBG system 3P camera employing three 1¼ inch or 1 inch plumbicon image pick-up tubes. As the color separating optical system, these cameras often employ an optical system constituted of a number of prisms and known as the Philips system after the Philips Company by which it was developed. In order to attain uniform sensitivity in these cameras, an F/2.2 objective is used as the standard lens for the 1¼ inch plumbicon and an F/1.6 objective is used as the standard lens for the 1 inch plumbicon.

In addition to the above-mentioned 1¼ inch and 1 inch image pick-up tubes, there has recently been developed a ⅔ inch tube which is coming into increasingly wider use along with the rise in demand for compact and handy cameras. Although it would be desirable to use an objective of a brightness as great as F/1.1 with such a ⅔ inch tube, this is not altogether feasible technically or geometrically. Still a lens of greater brightness than the F/1.6 lens used with the 1 inch plumbicon, say a lens on the order of F/1.4, is an absolute necessity in a camera employing a ⅔ inch plumbicon image pick-up tube.

There have also been other rapid developments in the field of television image pick-up tubes over the past few years and tubes other than the plumbicon such as the chalnicon and the saticon have also been applied to television broadcasting.

The plumbicon differs from the other two tubes mentioned in that its photoelectric conversion film is of high reflectivity so that a glass disc known as an anti-flare chip must be attached forward of the face plate in order to cut undesirable flare. The chalnicon, saticon and vidicon tubes do not require an anti-flare chip. Thus, in using a bright objective with the plumbicon image pick-up tube, it is possible to take full advantage of its performance only if careful consideration is given to the overall glass length, that is, not only to the glass length of the color separation prism which functions to compensate for the aberration of the objective but also to that of the face plate and anti-flare chip used in front of the image pick-up tube.

Strictly speaking, any objective regardless of its brightness is best used with the glass length envisioned at the time of design. As a practical matter, however, a lens of a brightness of less than around F/2 can be used fairly satisfactorily with a glass length differing somewhat from that initially envisioned. This is not true, however, in the case of a lens of a brightness on the order of F/1.4. Therefore, since lenses of different brightness are used with the plumbicon, saticon, chalnicon and other image pick-up tubes, it has not been possible to employ a common prism-type color separating optical system for all types of image pick-up tubes.

What is more, the sensitivity of the chalnicon tube increases more rapidly on the long wavelength side than does that of the plumbicon so that for this reason also it has been impossible to use a common color separating optical system.

However, as an increasing variety of image pick-up tubes come into practical use, the inconvenience of having to change the color separating optical system each time the image pick-up tube is changed will make itself more apparent. Thus, it is highly desirable to have a color separating system which can be easily adapted to match the requirements of any type of image pick-up tube.

SUMMARY OF THE INVENTION

In view of the above mentioned drawbacks and problems inherent in the conventional color separating optical system for television cameras, it is one object of the present invention to provide a color separating optical system which can be adapted for use with each of two or more types of image pick-up tubes.

Another object of the present invention is to provide such a color separating system which is exceedingly easy and simple to adapt to any given type of image pick-up tube.

Still another object of the present invention is to provide such a color separating optical system which can be easily constructed by making only a minor change in a conventional color separating system for a television camera.

The color separating optical sytem for a television camera in accordance with the present invention comprises a color separating prism system and a means for selectively inserting any one of one or more glass elements having parallel flat sides between said color separating prism system and the objective of a television camera. In usage, the glass length of the optical system is adjusted to meet the requirements of the particular image pick-up tube employed by inserting the proper one of said glass elements. Thus the same color separating optical system can be used with two or more types of image pick-up tubes.

BRIEF DESCRIPTION OF THE DRAWING

FIG. 6 is a graph showing the spectroscopic sensitivity characteristics of various types of television image pick-up tubes, FIG. 7 is a perspective view of an example of a mechanism for insertion and removal of a glass element having parallel flat sides in accordance with the present invention, and FIG. 8 is a somewhat schematic view of three glass elements mounted in a single frame.

PREFERRED EMBODIMENTS OF THE INVENTION

Figure 1:
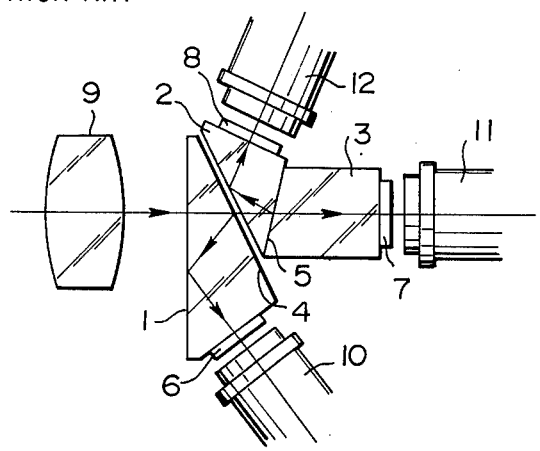
FIG. 1 is a diagrammatic view showing a conventional color separating optical system for a television camera.

As one example of a prism-type color separating optical system for a television camera, there is shown in FIG. 1 the conventional optical system known as the Philips system. As this system is very well known, it will not be necessary to describe it beyond pointing out that in FIG. 1, the reference numerals 1, 2 and 3 show prism blocks made of glass combined with a dichroic layer 4 for reflecting blue light, a dichroic layer 5 for reflecting red light, a blue light trimming filter 6, a green light trimming filter 7, a red light trimming filter 8, an objective 9 and image pick-up tubes 10, 11 and 12.

Figure 2:
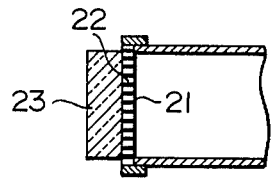
FIG. 2 and FIG. 3 are sectional views of the forward parts of two conventional image pick-up tubes.
Figure 3:
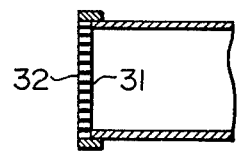

As is shown in FIG. 2, when a plumbicon is used as the image pick-up tube in the system shown in FIG. 1, it is provided forward of its photoelectric conversion film 21 with a face plate 22 and an anti-flare chip 23. On the other hand, when a chalnicon, saticon or vidicon is used, a face plate 32 is attached in front of photoelectric conversion film 31 as shown in FIG. 3. In a case where a ⅔ inch plumbicon image pick-up tube is employed, the thickness of the face plate is about 2.3mm and that of the anti-flare chip about 3.7mm so that a glass thickness of about 6mm exists forward of the photoelectric conversion film. When a vidicon, saticon or chalnicon image pick-up tube is employed, the thickness of the face plate is between about 1.3 and 2mm, meaning that the glass thickness forward of the photoelectric conversion film is between 4 and 4.7mm less than when a plumbicon image pick-up tube is used. Thus, as mentioned earlier, difficulties arise in attempting to use these various types of image pick-up tubes with a color separating optical system having a specific fixed glass length. For example, when the plumbicon and saticon tubes are used in the same television camera having an F/1.4 objective and an optical system designed to pass an F/1.4 beam, the total glass length including the glass length of the separating prism used as the basis for designing the objective will differ by more than 4mm between the plumbicon and the saticon. Thus when the objective is used at a brightness in the neighborhood of F/1.4, the modulation factor of one or the other of the two image pick-up tubes will fall by such an extent as to make operation impractical.

Figure 4:
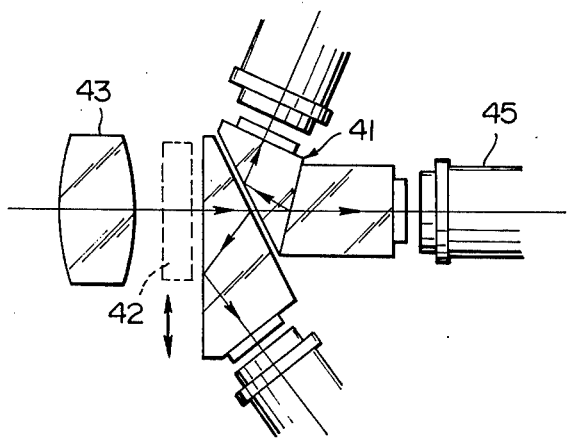
FIG. 4 is a diagrammatic view of one embodiment of a color separating optical system for a television camera in accordance with the present invention.

Referring now to FIG. 4, if in this case color separating prism 41 is designed for use with a plumbicon image pick-up tube, that is for the image pick-up tube having the greater glass thickness forward of its photoelectric conversion film, then when a saticon image pick-up tube is used, the glass length of the system including that of the color separating prism can be matched to that used as the basis for design of the objective by inserting between color separating prism 41 and objective 43 a glass element 42 having parallel flat sides and having a thickness equal to the difference in the glass thicknesses ahead of the photoelectric conversion films of the saticon and plumbicon tubes. By this simple modification of providing for the insertion and removal of a glass element 42 having parallel flat sides, it becomes possible to use two different types of image pick-up tubes with one and the same color separating optical system.

Figure 5:
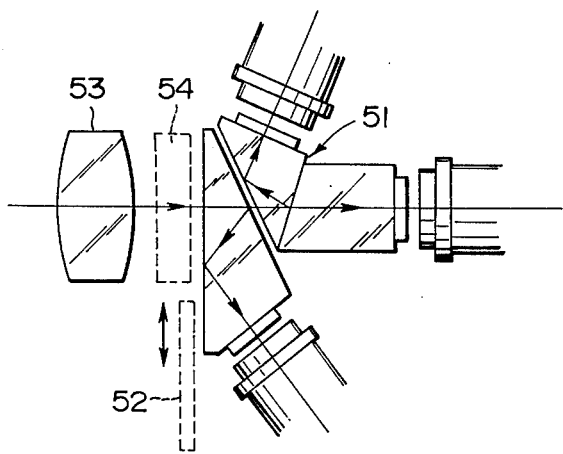
FIG. 5 is a diagrammatic view of another embodiment of a color separating optical system for a television camera in accordance with the present invention.

Further, as shown in FIG. 5, it is possible to insert a thin glass element 52 between color separating prism 51 and objective 53 at the time of using a plumbicon image pick-up tube and, at the time of using an image pick-up tube does not use an anti-flare chip, to replace thin glass element 52 with a glass element 54 of a greater thickness selected in accordance with the thickness of the face plate of the image pick-up tube concerned. As shown in FIG. 8, the glass elements 42, 52 and 54, may be mounted in a single frame 55. The frame is then slidably mounted by means not shown.

FIG. 6 shows the spectroscopic sensitivity characteristics of various image pick-up tubes. Curve 61 represents the characteristics of the plumbicon, 62 those of the plumbicon (red sensitized), curve 63 those of the saticon, curve 64 those of the vidicon, curve 65 those of the chalnicon and curve 66 those of the newvicon. It will be noted from these curves that the spectroscopic sensitivity characteristics of the plumbicon and the saticon are fairly similar so that in designing a color separating optical system for use with both of these, an acceptable degree of color reproduction can be attained only by compensating for the difference in glass length. However, if the color separating optical system is also to be used with the chalnicon image pick-up tube whose sensitivity curve (curve 65) extends over to the long wavelength side, it is also necessary to take the difference in spectroscopic sensitivity characteristics into consideration.

This problem can be overcome in the embodiment shown in FIG. 5, for example, by using as the glass elements 52 and 54 infrared cut filters of different characteristics or by using one element having an infrared cut filter and another element not having such a filter. The elements so provided are of course selected for insertion into the optical system in accordance with the glass length and spectroscopic characteristics of the particular image pick-up tube in use.

A specific example of a mechanism for permitting insertion and removal of the glass element shown in FIG. 4 is illustrated in FIG. 7 in which 71, 72 and 73 are prism blocks forming a conventionally known color separating prism and 74 is a prism support.

A support frame 75 is provided between the objective (not shown) and prism block 71. Support frame 75 has a groove 76 provided on the inside of each of its vertical sides. To the outside top of each vertical side of the support frame 75 is attached a clamp 77. By 81 is represented an insertion member having ridges 82 for fitting into said guide grooves 76. Insertion member 81 is provided with a glass element 83 corresponding to glass element 52 in FIG. 4 and is further provided with a pair of projections 84.

The optical system is shown in FIG. 4 in the state in which it is used with a plumbicon image pick-up tube having an anti-flare chip. When the system is to used with, for instance, a saticon image pick-up tube, the insertion member 81 is moved in the direction of the arrow until ridges 82 have slid down into guide grooves 76 and projections 81 have been engaged by clamps 77. As a consequence, glass element 83 comes into position between the objective (not shown) and prism block 71 to provide an additional amount of glass length equal to the difference in glass lengths forward of the photoelectric conversion films of the plumbicon and saticon image pick-up tubes. The color separating optical system can therefore be used with either a plumbicon or a saticon image pick-up tube.

To accomplish the insertion of glass elements in accordance with the embodiment shown in FIG. 5, it is only necessary to prepare two insertion members of the type shown in FIG. 7 each having a glass element or an infrared cut filter of appropriate thickness for the type of image pick-up tube with which it is to be used.

It is also possible to provide a plurality of glass elements along the length of a single insertion member and to insert the member between the objective and the color separating prism so that the appropriate one of the glass elements falls in the optical path.

Although the embodiments described all employ the Philips type prism, this invention is not limited to usage with such prism and can obviously be used with any of various other known types of color separating optical systems.

We claim:

1. In a color separating optical system for a television camera comprising a color separating optical system composed of a plurality of prisms provided between an objective and one or more television image pick-up tubes, the improvement wherein means is provided for inserting between said prism and said objective any one of a plurality of glass elements having parallel flat sides and of different thicknesses, wherein the thickness of each said glass element is determined in relation to a particular type of image pick-up tube, whereby insertion of a glass element adjusts the glass length of the optical system to the requirements of a particular type of pick-up tube.

2. A color separating optical system for a television camera as defined in claim 1 wherein each of said glass elements is held in a separate frame.

3. A color separating optical system for a television camera as defined in claim 1 wherein said glass elements are arranged along the length of a single frame.

4. A color separating optical system for a television camera as defined in claim 1 wherein one or more of said glass elements are infrared cut filters.

* * * * *